United States Patent
Ou

(10) Patent No.: US 8,578,450 B2
(45) Date of Patent: Nov. 5, 2013

(54) METHODS FOR DISTRIBUTING INFORMATION USING SECURE PEER-TO-PEER COMMUNICATIONS

(75) Inventor: Shukong Ou, Winchester, MA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1041 days.

(21) Appl. No.: 12/143,521

(22) Filed: Jun. 20, 2008

(65) Prior Publication Data

US 2009/0320102 A1   Dec. 24, 2009

(51) Int. Cl.
    *H04L 29/06*   (2006.01)
(52) U.S. Cl.
     USPC ............................................................. 726/4
(58) Field of Classification Search
     USPC ............................................................. 726/4
     See application file for complete search history.

(56) References Cited

U.S. PATENT DOCUMENTS

| | | | |
|---|---|---|---|
| 2001/0031640 A1* | 10/2001 | Waller et al. | 455/456 |
| 2003/0112977 A1* | 6/2003 | Ray et al. | 380/270 |
| 2003/0188010 A1 | 10/2003 | Raza et al. | |
| 2005/0038876 A1* | 2/2005 | Chaudhuri | 709/219 |
| 2005/0220045 A1 | 10/2005 | Lin | |
| 2006/0075222 A1* | 4/2006 | Moloney et al. | 713/156 |
| 2007/0256135 A1 | 11/2007 | Doralda et al. | |
| 2008/0037723 A1 | 2/2008 | Milstein et al. | |
| 2009/0028337 A1* | 1/2009 | Balabine et al. | 380/277 |

FOREIGN PATENT DOCUMENTS

WO    WO 2007/126521 A2    11/2007

OTHER PUBLICATIONS

"Understanding the Differences Between Public Key and Symmetric Key Encryption," Brian Posey, MCSE, FastTrack Video Labs, Posey Enterprises (c) 2002, http://www.brienposey.com/kb/public_vs symmetric_key_encryption.asp.

* cited by examiner

*Primary Examiner* — William Goodchild
(74) *Attorney, Agent, or Firm* — Akerman Senterfitt; Michael K. Dixon; Roy Zachariah

(57) ABSTRACT

A method for providing access to secure peer-to-peer communications to a device can include receiving a request to join an interest group. The request can include a device identification number of the device. The method can further include determining access rights for the device. The access rights can include permission to access shared messages of the interest group. Additionally, the method can include providing an access key to the device. The access key can enable the device to access shared messages of the interest group.

19 Claims, 6 Drawing Sheets

METHODS FOR DISTRIBUTING INFORMATION USING SECURE PEER-TO-PEER COMMUNICATIONS

FIELD OF THE DISCLOSURE

The present disclosure generally relates to communications networks, and more particularly relates to methods for distributing information using secure peer-to-peer communications.

BACKGROUND

Wireless access networks, such as cellular networks, enable mobile devices to wirelessly access information. Consumers increasingly rely upon cellular telephones and other wireless devices for continual access to information. However, limited coverage areas and overloaded networks may limit consumers' wireless access to information. Distance and terrain can affect the wireless signal and the number of access points may be limited resulting in gaps in the service area, especially in isolated areas. Additionally, when a large number of people gather at popular events, such as sporting events or concerts, overloaded access points can result in performance degradation and potential loss of communication performance. Natural and man-made disasters can also simultaneously reduce the number and increase the demand for functioning access points.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
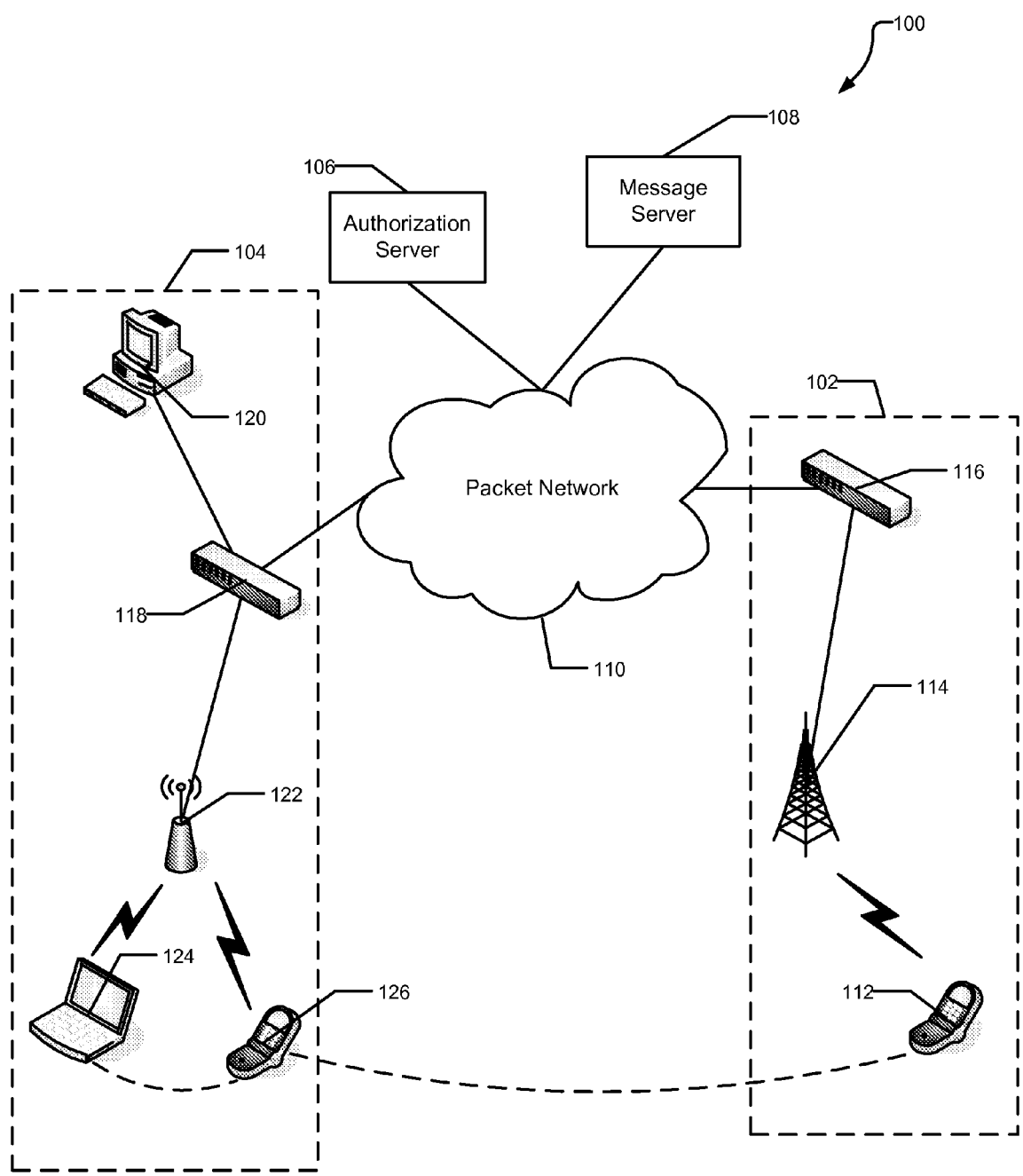
FIG. 1 is a block diagram illustrating a communications network in accordance with one embodiment of the present disclosure.

FIG. 1 shows an illustrative embodiment of a communications network 100. Communications network 100 can include a cellular network 102 and a local area network (LAN) 104. The cellular network 102 and the LAN 104 can communicate with each other and with authorization server 106 and message server 108 through a packet network 110, such as the Internet. In an alternate embodiment, the cellular network 102 may communicate with the authorization server 106 and the message server 108 through a separate private network.

The cellular network 102 can provide a cellular telephone 112 with access to the communications network 100. For example, the cellular telephone 112 may access various email accounts and the World Wide Web through the communications network 100. The cellular telephone 112 can communicate wirelessly with a cell tower 114. The cell tower 114 can communicate with the communications network through a data network 116. In an embodiment, additional cell towers can be connected to the data network 116, and communication between cell towers can occur on data network 116 without passing to the packet network 110.

LAN 104 can include a data network 118 in communication with the packet network 110. Computer 120 can communicate with the data network 118 through a physical connection, such as an Ethernet cable. Additionally, a wireless access point 122 can be connected to the data network 118. Mobile devices such as a portable computer 124 and a cellular telephone 126 can access the communications network 100 through the wireless access point 122 to access information such as email and the World Wide Web. Additionally, voice-over-IP can be used to provide voice communication via the LAN 104.

Mobile devices, such as laptop 124 and cellular telephones 112 and 126, can also communicate through a personal area network, such as a Bluetooth network. Additionally, ad-hoc wireless networks can provide communication between mobile devices when access to the communications network 100 is limited. Peer-to-peer communication between mobile devices can be used to transfer information, such as text messages, images, and video, between peer devices through the communications network 100, an ad-hoc wireless network, or a personal area network.

In an embodiment, peer-to-peer communication can be utilized to broadly distribute information such as an emergency message. The emergency message can be a severe weather alert, a national security alert, or other such emergency notifications. The message server 108 can broadcast the emergency message to peer devices 112, 124, and 126 with access to communications network 100. The peer devices can forward the emergency broadcast to devices without access to the communications network 100 using peer-to-peer communication. For example, a device within a building or tunnel may not receive the emergency message through the communications network 100, but may be within communications range of a peer device with access to the communications network 100.

In another embodiment, peer-to-peer communication can be used to forward an emergency request from an originating device without access to the communications network 100 through a peer device having access to the communications network 100. For example, a motorist stranded in a tunnel may originate an emergency message requesting assistance. The emergency message may include location information, such as GPS coordinates or the like. The originating device may pass the emergency message to the peer device, which can then forward the message through the communications network 100 and to the appropriate emergency responders. In an embodiment, the emergency message may be passed through multiple peer devices prior to reaching the communications network.

In another embodiment, the originating device can forward the emergency message to an emergency responder's device passing into peer-to-peer communications range of the originating device. In addition to forwarding the message to the communications network 100, the rescuers device may notify the emergency responder of the motorist's presence. Further, peer-to-peer communications may be used between the emergency responders device and the originating device to triangulate the location of the originating device.

In another example, a search device may originate a message to locate a lost individual. The search device can be a mobile device carried by emergency responder or search-and-rescue personnel. The lost individual's device may respond to the message with information alerting the rescuer to the presence and location of the lost individual. The search device can utilize the peer-to-peer communications to triangulate the location of the lost individual's device.

Figure 2:
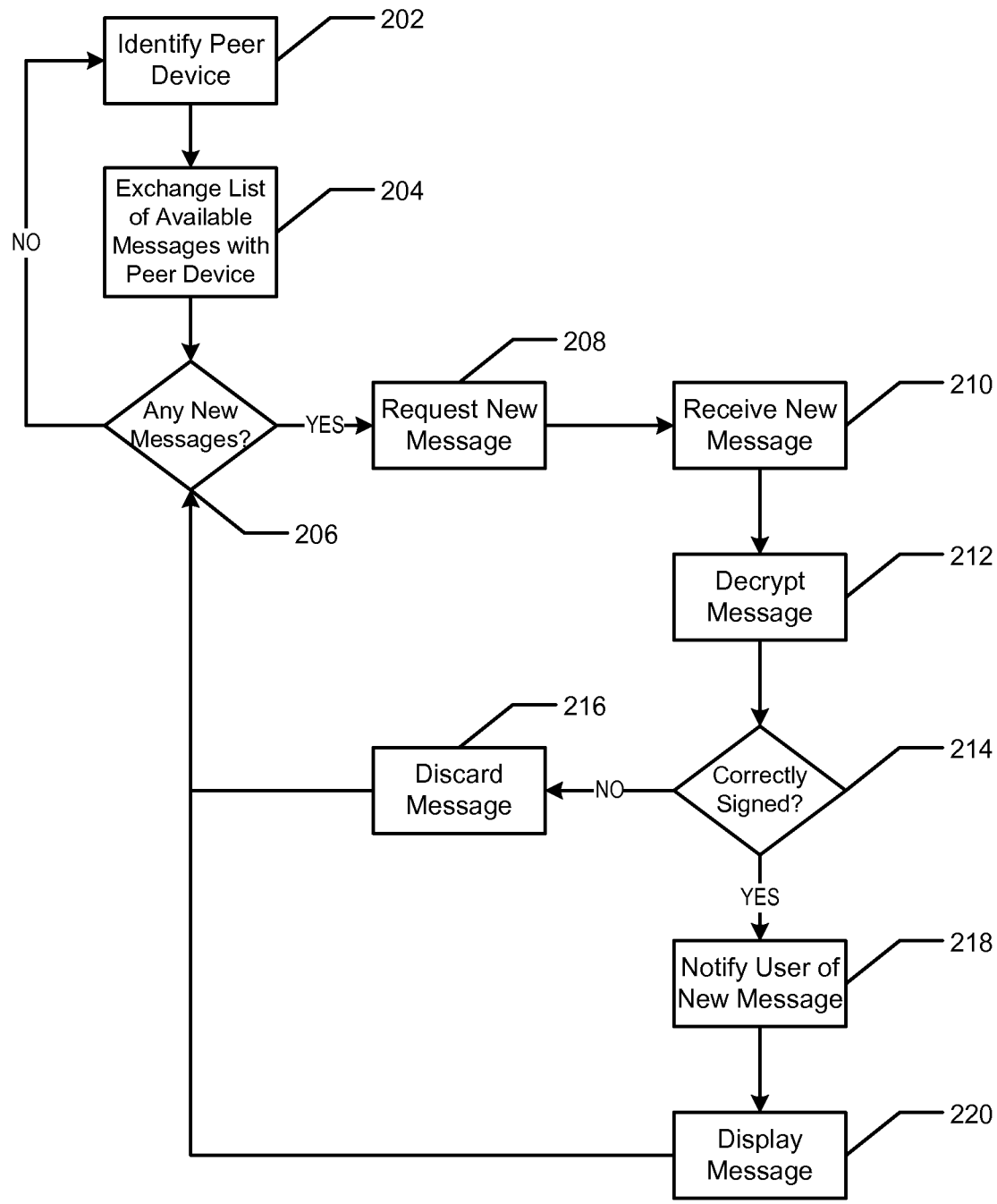
FIG. 2 is a flow diagram of an exemplary method for distributing secure peer-to-peer communications.

FIG. 2 shows an illustrative method of receiving secure peer-to-peer communications. At 202, a device, such as cellular telephone 126, can identify a peer device, such as cellular telephone 112 or computer 124. In an embodiment, when a device joins a network, such as through the wireless access point 122, the device can broadcast a message to other devices to identify peer devices. In another embodiment, when the device is within range of a cellular tower, such as cellular tower 114, the device can be notified of peer devices within range of the cellular tower. In yet another embodiment, a device can identify a peer device when within range of a personal area network, such as a Bluetooth network. For example, in a crowded area such as a sporting event, a concert, or another large gathering, messages can be passed between nearby peer devices. At 204, the device can exchange a list of available messages with the peer device. For example, the device can send to the peer device a list of messages stored on the device and, in turn, receive a list of messages stored on the peer device. The list can include a message identifier for each message. Additionally, the list can include a group identifier, a timestamp for the message, and other information relating to the stored messages. The timestamp may be used to delete or disregard older messages to limit the space required for storing messages. At 206, the device can identify new messages that have not been transferred to the device. The device can compare a list of previously received messages with the list of available message from the peer device. When no new messages are identified, the device can identify another peer device at 202.

Alternatively, when a new message is identified at 206, the device can send a request to the peer device for the new message as illustrated at 208. The peer device can send the new message to the device as illustrated at 210. The device can use an access key to decrypt the message as illustrated at 212. Either symmetric key encryption or asymmetric key encryption can be used to encrypt the message. Symmetric key encryption can use a single key for both encryption and decryption. Asymmetric key encryption can use a first key to encrypt the message and a second key to decrypt the message. Symmetric key encryption is typically faster than asymmetric key encryption and can be used for devices with limited computational resources. However, asymmetric key encryption can be used to verify the authenticity of a message when the encryption key is secret.

At 214, the device can verify the authenticity of the message. When asymmetric key encryption is used and the originator encryption key is secret, then successful decryption of a message provides verification for the message. Alternatively, when the originator encryption key is public or when using symmetric key encryption, a separate step is required to verify the authenticity of the message. For example, the message may be digitally signed using a different pair of asymmetric keys. Verification of the message can ensure that the message originated with an authorized party and that it was not altered in transit. When the message fails verification, the message can be discarded as illustrated at 216, and returning to 206 the device can determine if there are additional new messages.

Alternatively, returning to 214, when the message is verified, the device can notify a user of a new message at 218. For example, the device can produce a tone, flash, or vibration to indicate that a new message is available. At 220 the device can display the message to the user, and the device can check for additional new messages as illustrated at 206.

In an embodiment, the message can be encrypted using asymmetric encryption. An originator key can be used to encrypt the message such that an access key is required to decrypt the message. Only messages encrypted with the originator key can be successfully decrypted with the access key, limiting the ability to originate a message to authorized devices having the originator key.

In an alternate embodiment, the message can be encrypted using symmetric encryption. Symmetric encryption algorithms include Advanced Encryption Standard (AES), Blowfish, and the like. The key used to encrypt the message can be substantially similar to the key used to decrypt the message. Typically, symmetric encryption is faster than asymmetric encryption and may be used for devices with limited computational resources.

In another alternate embodiment, the message can be digitally signed with a first key and encrypted with a second key. For example, the digital signature can be generated using a private originator key of an asymmetric signature key pair and the message can be encrypted with a public originator key of an asymmetric encryption key pair. Alternatively, the digital signature can be generated using the private originator key of an asymmetric signature key pair and the message can be encrypted using symmetric key encryption.

Figure 3:
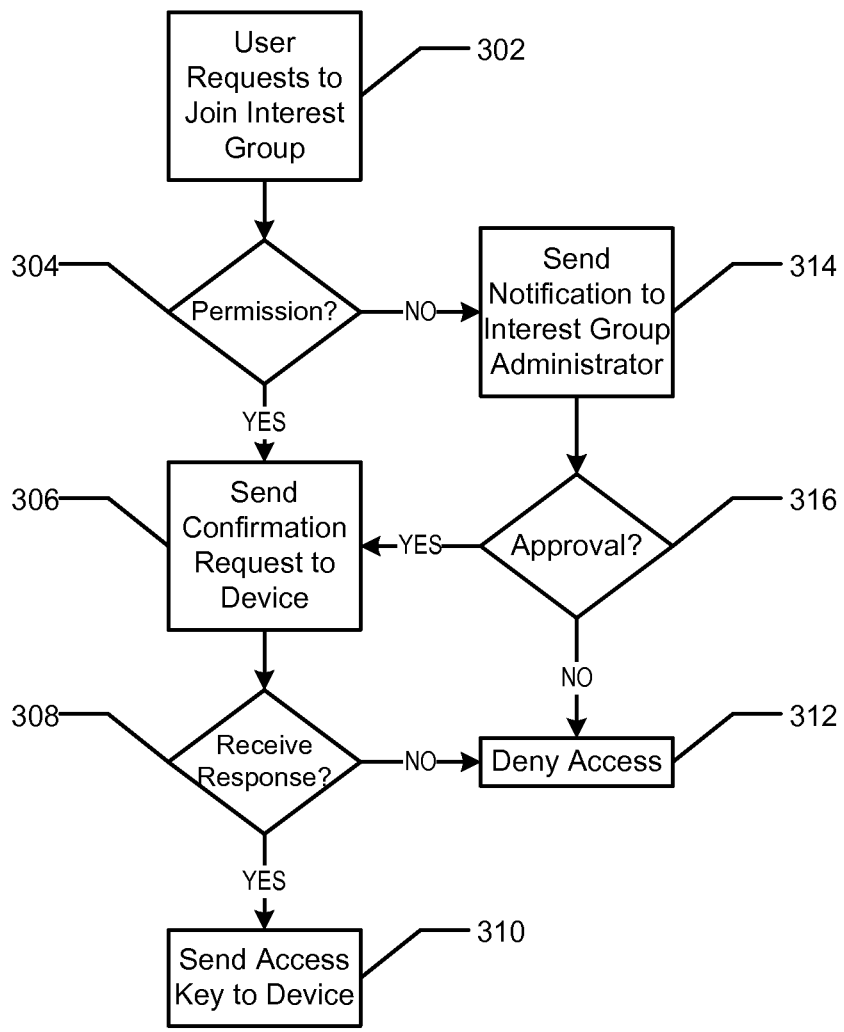
FIG. 3 is a flow diagram of an exemplary method for joining a group receiving secure peer-to-peer communications.

FIG. 3 shows an illustrative method of joining a group receiving secure peer-to-peer communications. At 302, a user can request to join an interest group. In an embodiment, a request to join an interest group can be by web site, by a telephone call to a helpdesk representative, or an SMS code sent to a subscription registration number. The request to join the interest group can identify a device for receiving secure peer-to-peer communications directed to the interest group. For example, the device can be identified by a cellular telephone number, an electronic serial number, a mobile identification number, media access control (MAC) address, or other unique identifier. The interest group can be a group receiving secure peer-to-peer communication related to a specific topic. In an embodiment, the interest group can include first responders interested in emergency notifications. Alternatively, the interest group can include people interested in stock quotes or sports scores. Further, an interest group can include people interested in news and events related to a school, church, or other organization. The interest group may be a private interest group with closed membership requiring approval to join. Alternatively, the interest group may be a public interest group with open membership. At 304, a server such as authorization server 106 can determine an access level for the user. The access level may include permission to originate and view messages or may only include permission to view messages.

When the access level for the user can be determined, at 306 a confirmation request can be sent to the device identified by the user. The confirmation request can be used to verify the identity of the device to prevent subscribing another device by mistake, such as an incorrectly entered device identifier. When the server receives a response to the confirmation request at 308, the server can send an access key to the device as illustrated at 310. The access key can enable the device to decrypt messages sent to the interest group. Additionally, depending on the level of access granted, an originator key can be sent to the device to enable creating messages to send to the interest group. Alternatively, the access key can enable both sending and receive messages. In an alternate embodiment, the server can send a usage profile and a symmetric access key to the device. The usage profile can indicate if the device has permission to create messages to send to the interest group. Additionally, the usage profile may be encrypted.

When a response to the confirmation request is not received at 308, the server can deny access to the interest group as illustrated at 312. The server may notify the user that access to the interest group is denied, such as by sending an email to the user or by sending a message to the device.

In an alternate embodiment, the confirmation request can include the access key. If the confirmation request is declined, the device can discard the access key. Additionally, the access key may be encrypted or locked. When requesting to join the interest group, the user may be presented with a code. When the confirmation request is received, the code can be entered on the device to unlock the access key.

Returning to 304, when an access level cannot be determined for the user, the server can send a notification to an interest group administrator as illustrated at 314. For example, when the interest group is private, administrator approval may be required before the user can be granted view-only access. Additionally, administrator approval may be required before granting permission to originate messages. At 316, when the server receives approval from the interest group administrator, the server can send a confirmation request to the device, as illustrated at 306. Alternatively, when the server does not receive approval from the interest group administrator, the server can deny access to the interest group as illustrated at 312.

Figure 4:
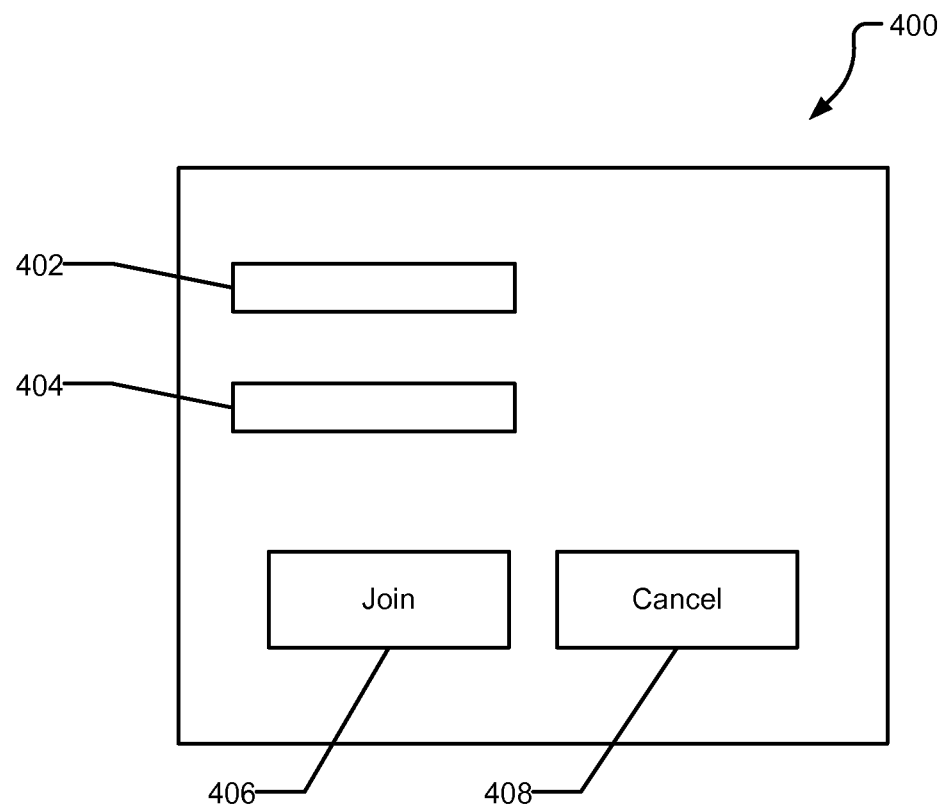
FIG. 4 is a block diagram illustrating an exemplary interface for joining a group receiving secure peer-to-peer communications.

FIG. 4 shows an illustrative embodiment of an interface 400 for joining a group receiving secure peer-to-peer communications. For example, interface 400 can be a web page provided by authentication server 106. Additionally, access to interface 400 may require logging into the website using an account associated with a device, such as a billing account for a cellular telephone. Alternatively, interface 400 can be an application interface on a device for receiving messages sent to the interest group. Interface 400 can include an interface element 402 to identifying an interest group. Interface element 402 can be a selection element, such as a pull down menu or a list of available interest groups. Alternatively, interface element 402 can be a text input element for entering a name of an interest group. Further, interface element 402 can provide a search function to search for interest groups based on keywords or other searchable fields.

When interface 400 is not an application interface on the device, interface 400 can include an interface element 404 to identify the device. Interface element 404 can be a selection element to choose a device associated with a user account. Alternatively, interface element 400 can be a text input element for entering device identification information. Additionally, when logging into a website is not required to access interface 400, interface 400 may include an interface element (not shown) for providing authentication information such as a username and password.

Additionally, interface 400 can include interface elements 406 and 408. Interface element 406 can be a join button for joining the interest group after identifying the interest group and the device. Interface element 408 can be a cancel button to return to a previous interface when the user decides against joining the interest group or elects to unsubscribe or depart the interest group's membership.

Figure 5:
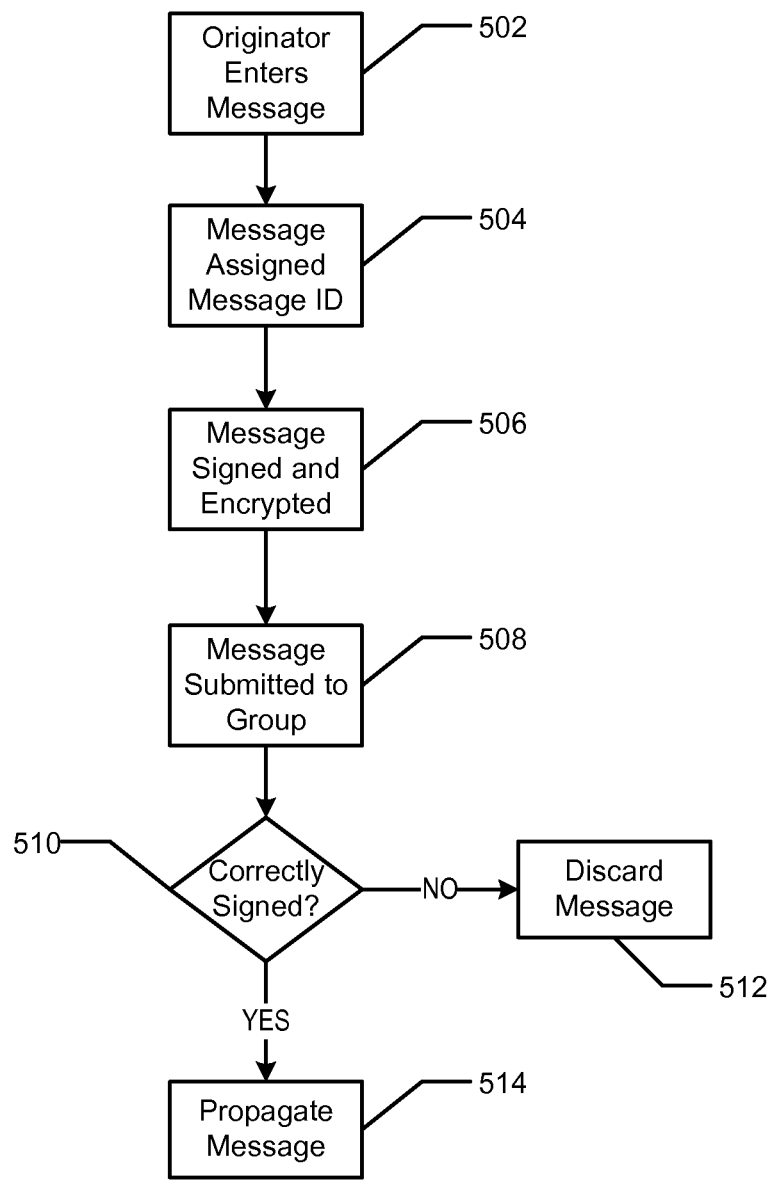
FIG. 5 is a flow diagram illustrating an exemplary method for sending secure peer-to-peer communications.

FIG. 5 shows an illustrative method of sending secure peer-to-peer communications to a group. At 502, an originator can enter a message into a device authorized to send messages to an interest group. The device can be a cellular telephone such as cellular telephone 112, or a computer such as computer 120. At 504, the message can be assigned a message identification number. The message identification number can be a number that uniquely identifies a message. For example, the message identification number can be based upon the time the message is created and the device where the message originates. At 506, the message can be signed and encrypted. As discussed previously, when the message is encrypted using asymmetric key encryption, a separate signature key may not be required. Alternatively, a digital signature can be appended to the message. At 508, the message can be submitted to the interest group. The message can be sent through a communications network to a message server, such as message server 108. In an embodiment, the message server can archive the message to provide a message history and as a log of message events for potential forensic analysis. Alternatively, the message can be passed directly to a peer device.

At 510, the message can be checked to determine if the message is from an authorized originator. For example, the message server or peer device can decrypt the message and verify the digital signature. When the digital signature is invalid, the message can be discarded as illustrated at 512. Alternatively, when the digital signature is valid, the message can be propagated to other members of the interest group as illustrated at 514. For example, the message server can broadcast the message to available members of the interest group and peer devices can forward the message to members of the interest group that have not received the message. Additionally, the message server can store the message and provide the message to members of the interest group that request the message from the message server, such as when network access is restored to an authorized device.

Figure 6:
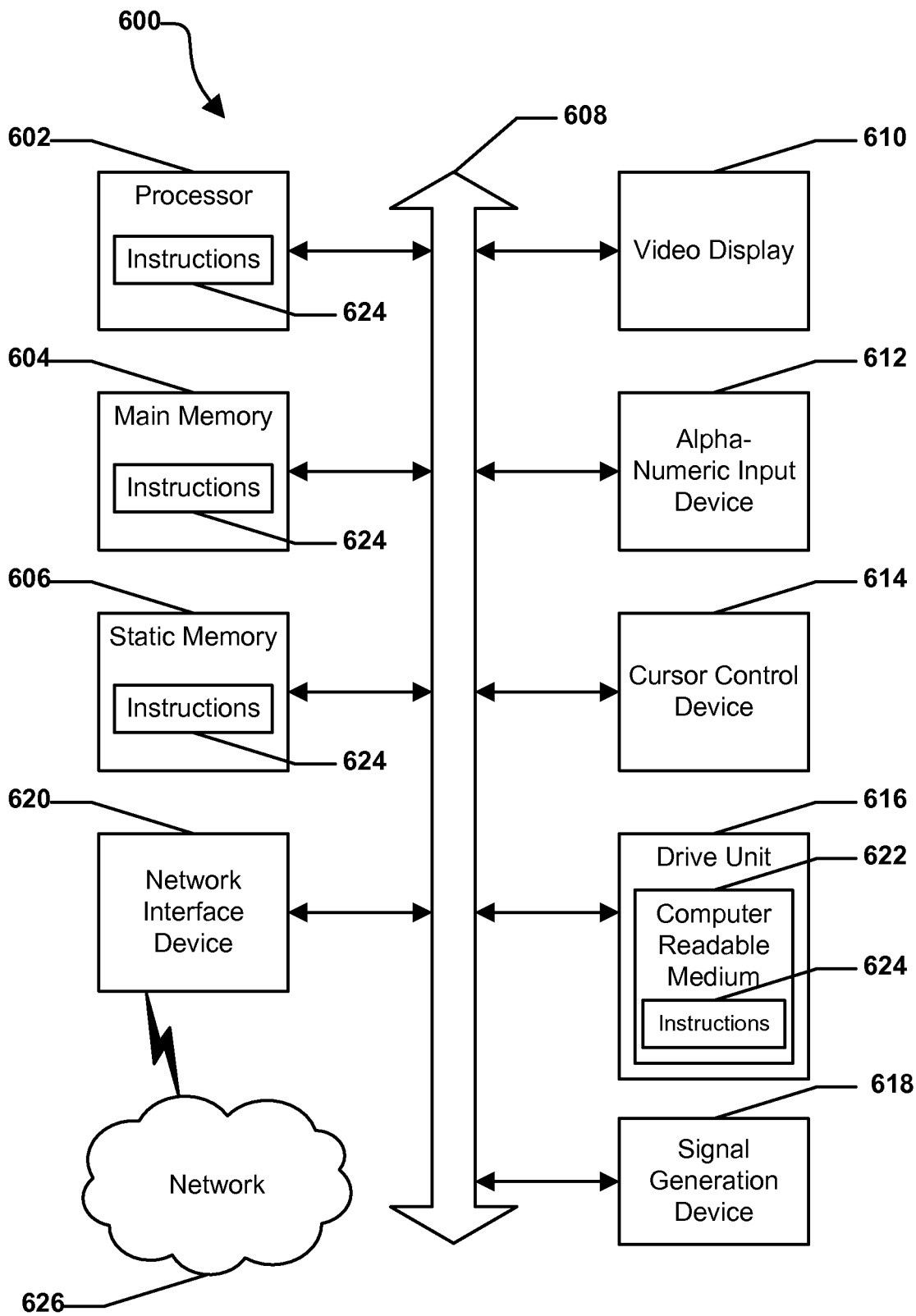
FIG. 6 is an illustrative embodiment of a general computer system.

FIG. 6 shows an illustrative embodiment of a general computer system 600. The computer system 600 can include a set of instructions that can be executed to cause the computer system to perform any one or more of the methods or computer based functions disclosed herein. The computer system 600 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602, such as a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610 such as a liquid crystal display (LCD), an organic light emitting diode (OLED), a flat panel display, a solid state display, or a cathode ray tube (CRT). Additionally, the computer system 600 may include an input device 612 such as a keyboard, and a cursor control device 614 such as a mouse. Alternatively, input device 612 and cursor control device 614 can be combined in a touchpad or touch sensitive screen. The computer system 600 can also include a disk drive unit 616, a signal generation device 618 such as a speaker or remote control, and a network interface device 620 to communicate with a network 626. In a particular embodiment, the disk drive unit 616 may include a computer-readable medium 622 in which one or more sets of instructions 624, such as software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
   receiving a request from a mobile device to join an interest group, the request including an identification number of the mobile device;
   determining access rights for the mobile device, the access rights including permission to access shared messages of the interest group;
   sending a confirmation request to the mobile device in response to determining access rights;
   receiving a response to the confirmation request from the mobile device;
   providing an access key to the mobile device in response to receiving the response, the access key enabling a mobile device to access shared messages of the interest group received from the peer device;
   determining that the mobile device is without access to a communication network;
   identifying a first peer device to the mobile device, wherein the first peer device has access to the communication network;
   sending to the mobile device a first list of shared messages from the communication network via the first peer device;
   receiving a first request from the mobile device for a first message from the first list of shared messages, wherein the first message includes a message identifier, and wherein sending the first request is in response to determining that the first message is not in a second list of shared messages that was previously received by the mobile device, the determining being based upon the message identifier; and
   sending the first message to the mobile device via the first peer device.

2. The method of claim 1 wherein the mobile device identification number is selected from a group comprising a telephone number, a mobile identification number, an electronic serial number, and a media access control address.

3. The method of claim 1 wherein the access rights include permission to originate shared messages for the interest group.

4. The method of claim 3 further comprising providing a second access key to the mobile device, the second access key enabling the mobile device to originate shared messages for the interest group.

5. The method of claim 1 wherein determining access rights for the mobile device includes receiving approval for the mobile device from an interest group administrator.

6. The method of claim 1, further comprising:
   receiving a second request from the mobile device for a second message from the first list of shared messages, wherein the second request is received by the mobile device from a second peer device to the mobile device, wherein the second peer device is without access to the communication network; and sending the second message to the second peer device via the mobile device.

7. A web server comprising:
a memory that stores instructions; and
a processor that executes the instructions to perform operations, the operations comprising:
providing an interface to join an access group, the interface including a selection element for selecting an interest group, and
an input element for providing a device identification number;
determining access rights for a mobile device, the access rights include permission to access shared messages of the interest group;
send sending a confirmation request to the mobile device in response to determining access rights;
receiving a response to the confirmation request from the mobile device;
sending an access key to the mobile device in response to receiving the response, the access key enabling the mobile device to access shared messages of the interest group;
determining that the mobile device is without access to a communication network;
identifying that a first peer device to the mobile device has access to the communication network;
sending to the mobile device a first list of shared messages from the communication network via the first peer device;
receiving a first request from the mobile device for a first message from the first list of shared messages, wherein the first message includes a message identifier, and wherein receiving the first request is in response to determining that the first message is not in a second list of shared messages that was previously received by the mobile device, the determining being based upon the message identifier; and
sending the first message via the first peer device to the mobile device.

8. The web server of claim 7 wherein the device identification number is selected from a group comprising a telephone number, a mobile identification number, and an electronic serial number.

9. The web server of claim 7 wherein the access rights include permission to originate shared messages for the interest group.

10. The web server of claim 9 wherein the access key enables the mobile device to originate shared messages for the interest group.

11. The web server of claim 9 wherein the operations further comprise providing a second access key to the mobile device, the second access key enabling the mobile device to originate shared messages for the interest group.

12. The web server of claim 7 wherein determining access rights for the mobile device includes receiving approval for the mobile device from an interest group administrator.

13. A tangible computer readable device comprising a plurality of instructions to manipulate a processor, the plurality of instructions causing the processor to perform operations, the operations comprising:

receiving a request to join an interest group, the request including an identification number of a mobile device;
determining access rights for the mobile device, the access rights including permission to access shared messages of the interest group;
sending a confirmation request to the mobile device in response to determining access rights;
receiving a response to the confirmation request from the mobile device;
providing an access key to the mobile device in response to receiving the response, the access key enabling the mobile device to access shared messages of the interest group received from a peer device;
determining that the mobile device is without access to a communication network;
identifying that a first peer device to the mobile device has access to the communication network;
sending to the mobile device a first list of shared messages from the communication network via the first peer device;
receiving a first request from the mobile device for a first message from the first list of shared messages, wherein the first message includes a message identifier, and wherein receiving the first request is in response to determining that the first message is not in a second list of shared messages that was previously received by the mobile device, the determining being based upon the message identifier; and
sending the first message via the first peer device to the mobile device.

14. The computer readable device of claim 13, wherein the mobile device identification number is selected from a group comprising a telephone number, a mobile identification number, an electronic serial number, and a media access control address.

15. The computer readable device of claim 13, wherein the request originates with the mobile device.

16. The computer readable device of claim 15, wherein the access key enables the mobile device to originate shared messages for the interest group.

17. The computer readable device of claim 15, wherein the operations further comprise:
providing a second access key to the mobile device, the second access key enabling the mobile device to originate shared messages for the interest group.

18. The computer readable device of claim 13, wherein determining access rights for the mobile device includes receiving approval for the mobile device from an interest group administrator.

19. The computer readable device of claim 13, wherein the operations further comprise:
sending a second request from the mobile device for a second message from the first list of shared messages, wherein the second request is received by the mobile device from a second peer device to the mobile device, wherein the second peer device is without access to the communication network; and
sending the second message to the second peer device via the mobile device.

* * * * *